(12) United States Patent
Sirotkin et al.

(10) Patent No.: US 11,895,538 B2
(45) Date of Patent: Feb. 6, 2024

(54) IMPROVING WI-FI SPECTRUM EFFICIENCY

(71) Applicant: Apple Inc., Cupertino, CA (US)

(72) Inventors: Alexander Sirotkin, Hod Hasharon (IL); Zhaohua Yi, Portland, OR (US)

(73) Assignee: Apple Inc., Cupertino, CA (US)

( * ) Notice: Subject to any disclaimer, the term of this patent is extended or adjusted under 35 U.S.C. 154(b) by 340 days.

(21) Appl. No.: 17/287,062

(22) PCT Filed: Nov. 19, 2019

(86) PCT No.: PCT/US2019/062172
§ 371 (c)(1),
(2) Date: Apr. 20, 2021

(87) PCT Pub. No.: WO2020/106698
PCT Pub. Date: May 28, 2020

(65) Prior Publication Data
US 2021/0360483 A1    Nov. 18, 2021

Related U.S. Application Data

(60) Provisional application No. 62/770,005, filed on Nov. 20, 2018.

(51) Int. Cl.
*H04W 28/26* (2009.01)
*H04L 27/26* (2006.01)
(Continued)

(52) U.S. Cl.
CPC ......... *H04W 28/26* (2013.01); *H04L 27/2607* (2013.01); *H04L 27/26025* (2021.01);
(Continued)

(58) Field of Classification Search
CPC ............. H04W 28/26; H04W 72/0446; H04W 72/0453; H04W 84/12; H04W 74/0816;
(Continued)

(56) References Cited

U.S. PATENT DOCUMENTS

| 2016/0227578 A1* | 8/2016 | Lee | H04W 74/004 |
| 2017/0048879 A1* | 2/2017 | Zhang | H04W 76/27 |

(Continued)

FOREIGN PATENT DOCUMENTS

| WO | 2013022471 A1 | 2/2013 |
| WO | 2015089282 A1 | 6/2015 |
| WO | 2015101974 A1 | 7/2015 |

OTHER PUBLICATIONS

PCT Search Report dated Mar. 16, 2020 in connection with PCT Application No. PCT/US2019/062172.
(Continued)

*Primary Examiner* — Jae Y Lee
(74) *Attorney, Agent, or Firm* — Eschweiler & Potashnik, LLC

(57) ABSTRACT

A device of a User Equipment (UE), a method to operate the device, and a machine readable medium. The device includes processing circuitry and a radio frequency (RF) interface coupled to the processing circuitry, the processing circuitry to: decode a signal sent in a cellular network from a base station (BS), the signal including a network allocation vector (NAV) information update regarding a NAV corresponding to a Wi-Fi network, the NAV to be set by a Wi-Fi station (STA) that is in the Wi-Fi network, and that is to be coupled to the UE via a connection; and send the NAV information update to the STA by way of the connection to allow the STA to set its NAV in the Wi-Fi network based on the NAV information update.

20 Claims, 6 Drawing Sheets

(51) Int. Cl.
*H04W 72/0446* (2023.01)
*H04W 72/0453* (2023.01)
*H04W 84/12* (2009.01)

(52) U.S. Cl.
CPC ... *H04W 72/0446* (2013.01); *H04W 72/0453* (2013.01); *H04W 84/12* (2013.01)

(58) Field of Classification Search
CPC .......... H04W 74/006; H04L 27/26025; H04L 27/2607
See application file for complete search history.

(56) References Cited

U.S. PATENT DOCUMENTS

2017/0111889 A1* 4/2017 Li .................. H04W 74/08
2018/0020375 A1 1/2018 Matsumoto et al.

OTHER PUBLICATIONS

PCT Written Opinion dated Mar. 16, 2020 in connection with PCT Application No. PCT/US2019/062172.

* cited by examiner

IMPROVING WI-FI SPECTRUM EFFICIENCY

CROSS REFERENCE TO RELATED APPLICATIONS

This application is a National Phase entry application of International Patent Application No. PCT/US2019/062172 filed Nov. 19, 2019, which This application claims the benefit of and priority from U.S. Provisional Patent Application No. 62/770,005 entitled "WI-FI SPECTRUM EFFICIENCY," filed Nov. 20, 2018, the entire disclosure of which is incorporated herein by reference.

FIELD

Various embodiments generally relate to the field of wireless communications using Wi-Fi and cellular networks.

BACKGROUND

Current Wi-Fi networks are currently affected by the hidden node problem where one station (STA) may start communicating being unaware of the presence of an interfering STA, in this way causing collisions on the air medium and inefficiencies with respect to spectrum use.

DETAILED DESCRIPTION

Figure 1:
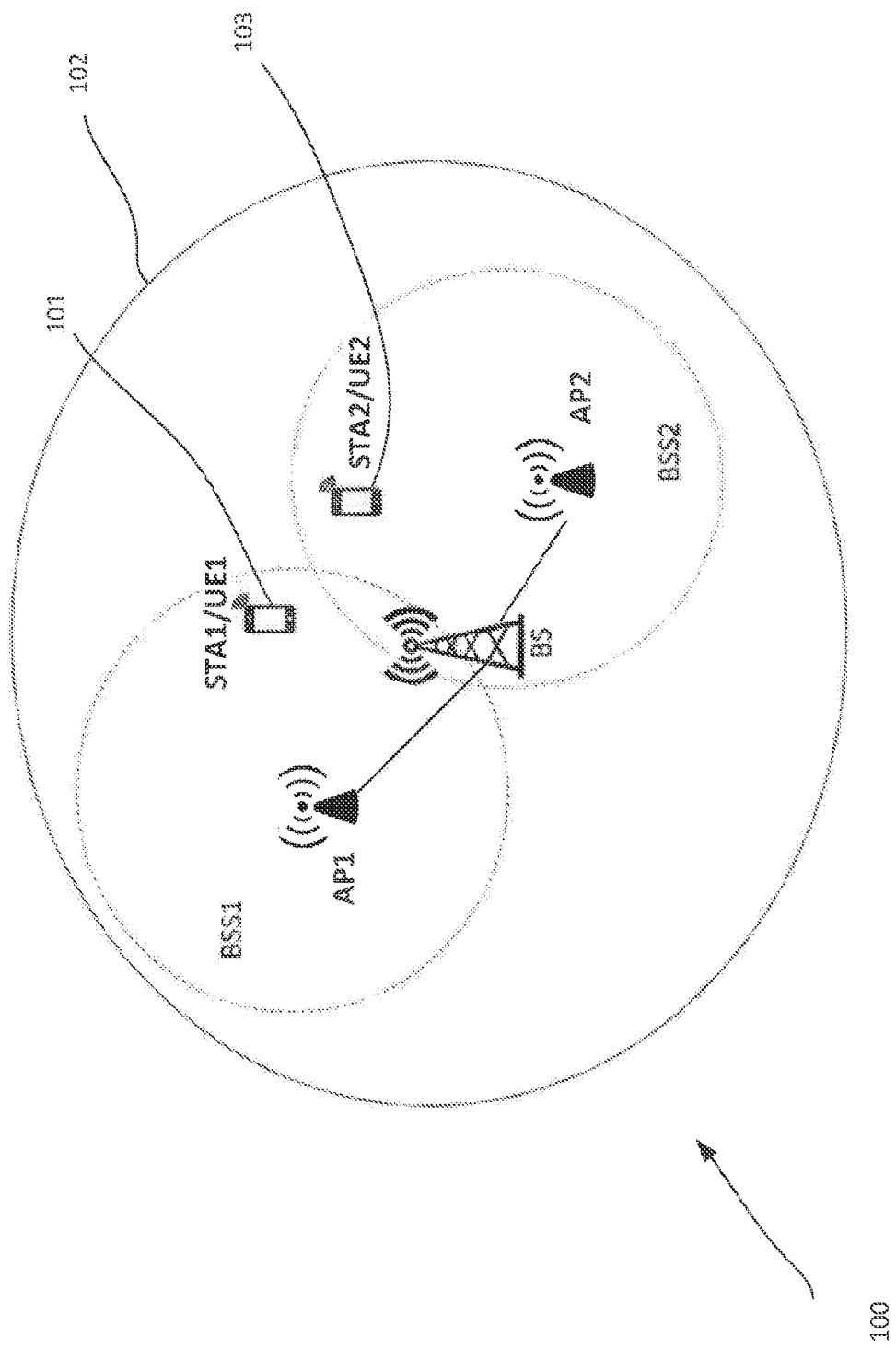
FIG. 1 illustrates a heterogeneous network (HN) including two Wi-Fi basic service sets and a cellular network.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Wi-Fi operates under free spectrum and uses a carrier sense multiple access with collision avoidance (CSMA/CA) channel accessing method, and Wi-Fi stations may sense the channel before they send data. If collisions and interference is detected, a Wi-Fi station may back off for a random time and re-transmits the data if the prior transmission failed. In dense environments, there is a higher possibility of collisions, and more hidden node issues. Additionally, Wi-Fi stations may sense the channel usage only when there is real traffic. A Wi-Fi station (STA) may not know of potential traffic from other stations, and the STA may be unable to sense the channel if there are hidden nodes. All of the above may cause more backoff and more retransmissions on the air medium, and therefore cause Wi-Fi inefficiencies in terms of spectrum usage.

In some embodiments, a NAV (Network Allocation Vector) may be distributed to Wi-Fi STAs by way of a 5G network in order to allow the STAs to implement CSMA/CA. According to the state of the art, a Wi-Fi station gets the NAV value only when it detects Wi-Fi traffic. However, such traffic is not detectable in the case of any hidden node issues. As a result, when the channel is idle, there may be a collision if two or more STAs try to transmit data at the same time. Among other things, embodiments of the present disclosure provide a method to use 5G (LTE, LTE-A or 5G New Radio (NR)) to distribute NAV to STAs by mapping NAV to 5G OFDM Symbols. A STA may use NAV to identify if the channel is free or not. If the NAV is sent to every STA appropriately, every STA can be notified of other STAs using the channel or about to use the channel, so that every STA can be aware of channel scheduling in order to prepare for channel usage without interrupting other STAs using or scheduled to use the channel. In some embodiments, a Wi-Fi NAV may be distributed using a licensed cellular spectrum, including Long Term Evolution (LTE), LTE-Advanced (LTE-A) or 5G NR.

According to some embodiments, the NAV value may be appropriately distributed to every STA in a timely manner. Embodiments of the present disclosure can reduce the Wi-Fi collision and reduce the need for back-offs re-transmissions in a Wi-Fi environment, thereby improving spectrum efficiency. Some embodiments may be used in an LTE/Wi-Fi co-existing network, LTE-Advanced/Wi-Fi co-existing network and a 5G NR (New Radio)/Wi-Fi co-existing network. Embodiments of the present disclosure may, according to one embodiment, be implemented without changing any protocol or standard (including Wi-Fi and/or cellular protocols or standards).

Embodiments of the disclosure may be used in Cellular (LTE, LTE-A and 5G NR)/Wi-Fi co-existing networks to offload the data traffic from a cellular network to a Wi-Fi network. Because a cellular network according to some embodiments can send a NAV value to STAs, the cellular network can further schedule and optimize the usage of Wi-Fi channels if wants to offload data traffic to Wi-Fi.

Embodiments of the present disclosure help address the hidden node issue in Wi-Fi networks.

FIG. 1 illustrates a heterogeneous network (HN) 100 including two Wi-Fi basic service sets BSS1 and BSS2, each including a respective access point AP1 and AP2 and a respective station STA1 and STA2, and a cellular network including a base station BS and user equipments (UEs) UE1 and UE2, as will be described further bellow. Each of STA1 and STA2 correspond to a mobile device 101 and 103, respectively. HN 100 further includes a cellular network 102 including base station BS as shown, and UE1 and UE2. Mobile device 101 includes STA1 and UE1 as shown, and mobile device 103 includes STA2 and UE2 as shown. In the instant description HN 100 helps to illustrate one example of the hidden node problem. When AP1 is transmitting data to STA1 in BSS1, STA2 cannot sense the energy of the data transmission, and if STA2 also transmits data at the same time within BSS2, its data transmission will interfere with that of STA1, which will cause the data transmission to STA1 to fail, and therefore cause backoff and retransmission of the data transmission. These cases make the use of Wi-Fi inefficient, especially in dense device environments where there is an increased likelihood of encountering the hidden node problem. Because a cellular network has larger coverage, according to an embodiment, it may be configured to send a NAV value to relevant STAs (including the hidden nodes) to notify them that there is a traffic.

Although the instant description refers to "mobile devices," embodiments are not so limited, and it is to be understood that they include within their scope wireless devices that are not necessarily mobile.

In conventional systems, STAs: (1) sense a physical channel and (2) retrieve NAV from real Wi-Fi traffic. In such conventional systems, for the hidden node issue, a STA cannot detect the physical radio that is using the channel, and therefore cannot set a NAV value as a result. Additionally, a STA cannot be aware of immediate future data traffic if the channel is idle, and several stations may try to use the channel, thereby causing collision, backoff or retransmission.

Some embodiments, by contrast, may use SG (LTE, LTE-A or SG NR) to distribute NAV to STAs by mapping NAV to SG OFDM Symbols. Embodiments help reduce Wi-Fi collision, reduce the backoffs and retransmissions, thereby improving spectrum efficiency.

Cellular/Wi-Fi Co-Existing Network

Referring still to FIG. 1, the BS may be a LTE/LTE-A eNodeB or gNodeB in a SG NR network. The Wi-Fi BSSs (Basic Service Sets) each include a respective Wi-Fi network with an AP and several STAs that connect to the AP. As noted previously, in the example of FIG. 1, there are two BSS in the cellular cell coverage area or cell 102. The mobile devices 101 and 103 not only correspond to Wi-Fi STAs, but also to respective cellular User Equipments (UEs). A cellular cell, such as cell 102, usually has larger coverage area than a Wi-Fi BSS, therefore, the same cellular cell can cover several Wi-Fi BSSs and the BS can communicate with all UE (STA) in the cell.

Mapping Wi-Fi NAV Value into SG OFDM Symbols.

Mapping Wi-Fi NAV into OFDM Symbols

In some embodiments, the SG orthogonal frequency division multiplexing (OFDM) symbol may be used to distribute the NAV value to STAs.

Figure 2:
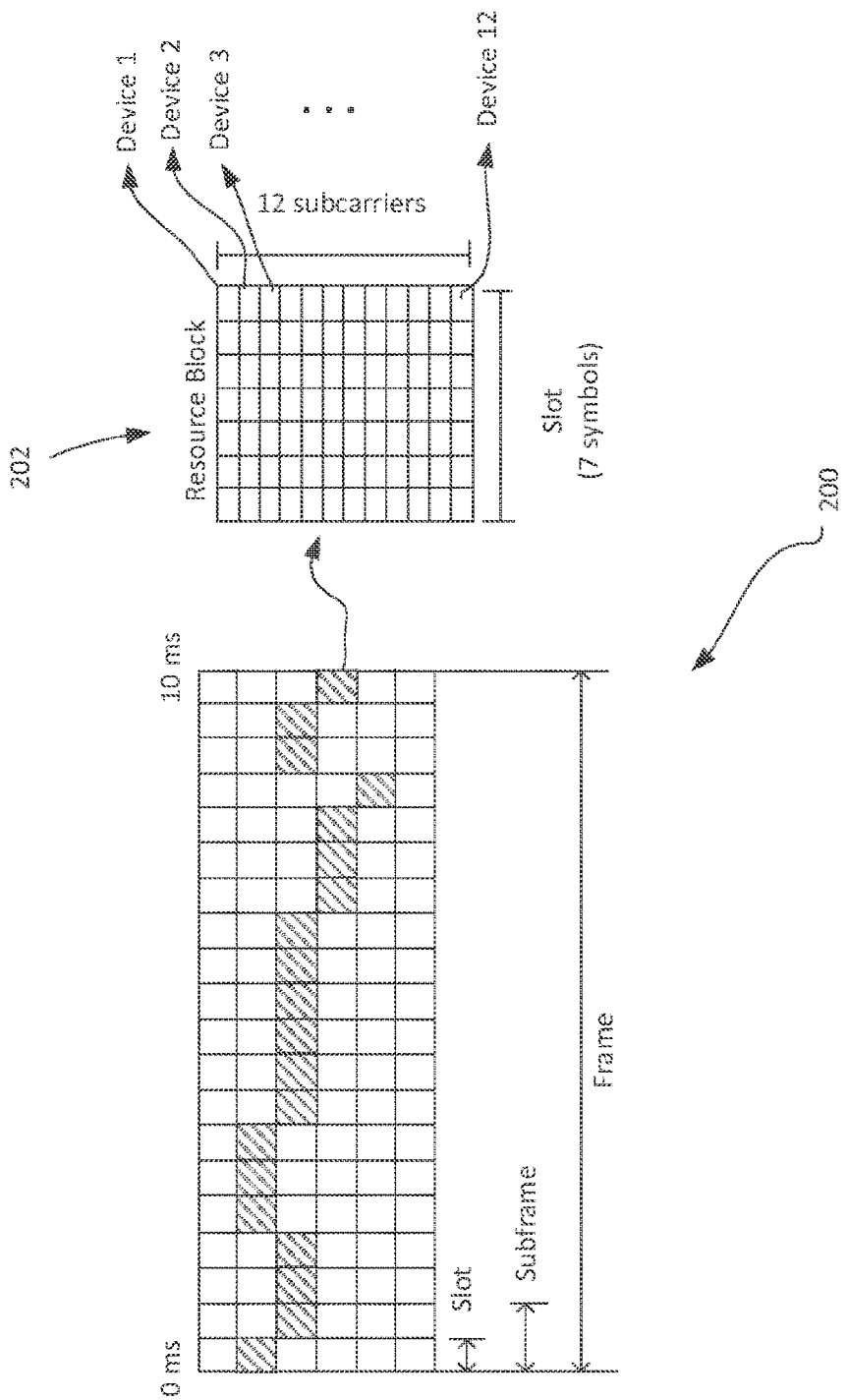
FIG. 2 illustrates an example of a cellular radio frame carrying NAV information according to an embodiment.

FIG. 2 illustrates an example of a cellular radio frame 200 carrying NAV information according to an embodiment. Frame 200 may for example be communicated from the BS in HN 100 to STA/UE1 and/or STA/UE2. The BS may, for example, reserve one or more resource blocks (RBs) in one or more time slots, a reserved RB 202 providing a NAV map for at most 12 client devices (such as mobile devices 101 and 103 of FIG. 1) with NAV information for one device per row/subcarrier (Device 1, Device 2, Device 3, . . . Device 12). RB 202 has 12 subcarriers, where every subcarrier may be allocated to one client device as noted above. If the client/mobile device number is more than 12, the BS may reserve more RBs in each slot to convey the NAV information. The slot number may be N %12+1, where N is the number of UE devices. For all mobile devices having STAs associated with an AP in a Wi-Fi network, the BS may send them the reservation of NAV RBs, so that each mobile station knows how to check the location of Wi-Fi NAV for itself. The mobile device may automatically check the specific RB to get the NAV value.

The following is an example of RB reservation for Device 2 in one time frame, as shown in FIG. 2: (2,3,3,3,2,2,2,3,3, 3,3,3,3,4,4,4,5,3,3,4) (2). That is, as shown for frame 200 of FIG. 2, for each of the 20 slots shown for frame 200, starting from left to right in the time domain, and from top to bottom in the frequency domain, the RB reservation for Device 2 corresponds to RB number 2 in the first slot, RB number 2 in the second slot, RB number 3 in the third slot, and so forth, up to RB number 4 in the $20^{th}$ slot of frame 200.

The data list inside the first parentheses above is thus an index of RBs in each time slot. The data inside the second parentheses, that is, "2," is the index of OFDM symbol inside the RB 202. Although RB 202 is shown as having 7 symbols in FIG. 2, and frame 200 is shown as having 20 slots, embodiments are not so limited, and include within their scope RB's with more or less symbols, and frames with more or less slots. The index of the OFDM symbol as noted above may be used to indicate which OFDM symbol in the designated RB may be decoded by the mobile device to set its NAV value. Therefore, Device 2 will keep checking these resource blocks in each time frame and get the NAV value from the specific OFDM symbol. The following section describes the details of how a retrieve the NAV value from an OFDM symbol.

In the instant description, by "encoding" or "decoding" what is meant is either a full or a partial "encoding" or "decoding." For example, a decoding of the RB may include a decoding of only the allocated OFDM symbol of the RB, or of the entire RB, or otherwise of a portion of the RB.

STAs to Retrieve the NAV Value from the OFDM Symbol

In order to help ensure every mobile device can decode the NAV information from designated RBs, these RBs may, according to one embodiment, be modulated using quadrature phase shift keying (QPSK). By virtue of the QPSK modulation, each symbol will contain two bits (i.e.: 00, 01, 10, or 11). According to one embodiment, symbol bits including "00" are to indicate a NAV value of one fourth of the symbol duration, symbol bits including "01" are to indicate a NAV value of two fourths of the symbol duration, symbol bits including "10" are to indicate a NAV value of three fourths of the symbol duration, and symbol bits including "11" are to indicate the entire symbol duration. If there is no signal/energy in the symbol duration designated for NAV information for the particular mobile device, this means the NAV value is 0.

Time Resolution

Table 1 below illustrates an example of NAV information being represented by an OFDM symbol in LTE, where the slot size is 0.S ms, and where, for normal CP, there are 7 symbols in one slot, with a symbol duration of 500/7=71.4 microseconds.

TABLE 1

LTE OFDM symbol duration with normal CP

| Symbol bits | NAVin microseconds |
| --- | --- |
| No signal | 0 |
| 00 | 17.8 |
| 01 | 35.7 |
| 10 | 53.5 |
| 11 | 71.4 |

Table 1 illustrates an example of how to retrieve NAV value from an OFDM symbol for different values of the OFDM symbol bits in QPSK. Because there are two bits in one symbol, the time resolution is one fourth of symbol duration. It is to be noted that the symbol duration is different as between LTE/LTE-A and SG NR, although similar principles as noted above may be applied to allow a mobile device to decode a NAV value from a SG NR network.

Table 2 bellow illustrates the NAV resolution in each network according to an embodiment, with the time unit being expressed in microseconds for an example NAV value of a fourth of the OFDM symbol duration of each network.

TABLE 2

NAV resolution in each network

| LTE/LTE-A Normal CP | LTE/LTE-A Extended CP | SG NR Subcarrier Space O | SG NR Subcarrier Space 1 | SG NR Subcarrier Space 2 Normal CP | SG NR Subcarrier Space 2 Extended CP | SG NR Subcarrier Space 3 | SG NR Subcarrier Space 4 | SG NR Subcarrier Space 5 |
|---|---|---|---|---|---|---|---|---|
| 17.8 | 20.8 | 17.8 | 8.9 | 4.5 | 5.2 | 2.2 | 1.1 | 0.6 |

The Processes of Distributing Wi-Fi NAV by Way of SG Signaling

Figure 3:
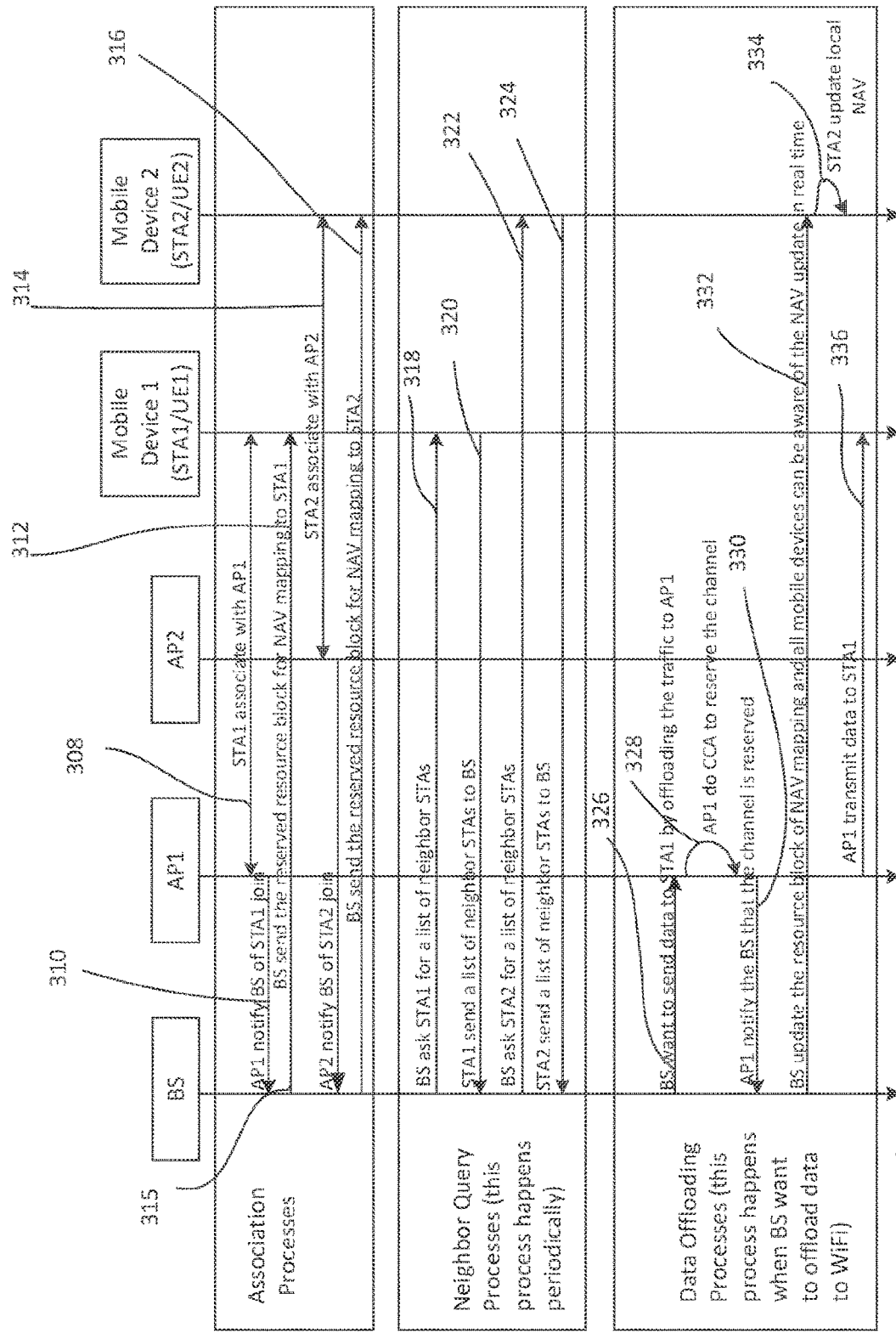
FIG. 3 illustrates an example of interactive processes among the network elements of FIG. 1.

FIG. 3 illustrates an example of interactive processes among the network elements in a HN such as HN 100 of FIG. 1. When a mobile device, such as a STA/UE joins the network, the BS may, according to one embodiment, reserve a subcarrier in a given RB. The BS will then notify the UE of the location of the designated RB so that the UE can decode signals within the RB in real time. In some embodiments, the SG network can schedule and optimize the data offload to Wi-Fi from LTE, LTE-Advanced or SG-NR. Embodiments of the present disclosure may help solve the Wi-Fi hidden node problem when Wi-Fi co-exists with LTE, LTE-Advanced or SG-NR.

In particular, referring still to FIG. 3, an example signaling diagram 300 is shown for an HN such as HN 100 of FIG. 1. Mobile device 1 is shown to include a Wi-Fi STA1 and a UE1, and mobile device 2 is shown to include a Wi-Fi STA2 and a UE2. Mobile device 1 and 2 may correspond respectively to STA1/UE1 and STA2/UE2 of FIG. 1.

Referring still to FIG. 3, the signaling example shown may be broken up into three phases, an association processes phase 302, a neighbor query processes phase 304, and a data offloading processes phase 306.

For the description herein, communications between a Wi-Fi enabled device, such as a mobile device or an AP, and the BS may be with a corresponding UE of the Wi-Fi enabled device that is within the BS' cellular network, and may be encoded, sent, received and/or decoded using cellular signaling, protocols and techniques. Where such communications include information for or about a STA, such information may, according to an embodiment, be conveyed/sent, within a same Wi-Fi enabled device, from the UE to the STA by way of circuitry internal to the Wi-Fi enabled device that includes the UE and the STA.

For the description herein, communications between a Wi-Fi enabled device, such as a mobile device or an AP, and the BS may be with a corresponding STA of the BS that is within the Wi-Fi enabled device's Wi-Fi network, and may be encoded, sent, received and/or decoded using Wi-Fi signaling, protocols and techniques. Where such communications include information for or about a STA, such information may, according to an embodiment, be conveyed/sent, within a same BS, from the cellular circuitry of the BS to the STA by way of circuitry internal to the BS that includes the cellular circuitry and the STA.

In the association processes phase 302, the STA1 may associate with AP1 at 308, and, thereafter, AP1 may notify the BS of STA1 having associated with it at 310. The BS may then send a signal at 312 to mobile device 1 letting STA1 know which resources, such as which RB, which subcarrier within the RB, and/or which OFDM symbol within the subcarrier, has been reserved in order to provide NAV mapping to STA1 when needed. The signal at 312 may be sent using cellular signaling by the BS to UE1, and resource information therein then sent to STA1 by circuitry internal to mobile device 1. Thereafter, at 314, STA2 may associate with AP2, after which AP2 may notify the BS of STA2 having been associated with it at 315. Thereafter, similar to operation 312 above, at operation 316, the BS may send a signal to mobile device 2 letting STA2 know which resources, such as which RB, which subcarrier within the RB, and/or which OFDM symbol within the subcarrier, has been reserved in order to provide NAV mapping to STA2 when needed. The signal at 316 may be sent using cellular signaling by the BS to UE2, and the resource information therein sent to STA2 by circuitry internal to mobile device 2.

In the neighbor query processes phase 304, the BS may send a signal at 318 to mobile device 1 including a request for a list of neighbor STAs of STA1. The signal at 318 may be sent to UE1 of mobile device 1 using cellular signaling. Thereafter, at 320, mobile device 1 may send a list of neighbor STAs of STA1 to the BS. The BS may further send a signal at 322 to mobile device 2 including a request for a list of neighbor STAs of STA2. The signal at 322 may be sent to UE2 of mobile device 2 using cellular signaling. Thereafter, at 324, mobile device 2 may send a list of neighbor STAs of STA2 to the BS.

In the data offloading processes phase 306, the BS may send data at 326 intended for mobile device 1 to AP1 for AP1 to send the data to STA1 of mobile device 1, the BS in this way offloading cellular traffic for mobile device 1 to the Wi-Fi network via AP1. Thereafter, at 328, AP1 may perform CCA to reserve the Wi-Fi channel for sending the data to the STA, and may, at 330, send a signal to the BS letting the BS know which Wi-Fi channel has been reserved to transmit the data to STA1 of mobile device 1. Thereafter, the BS may send a signal at 332 to mobile device 2 including NAV information, the NAV information being based on the reserved Wi-Fi channel, and being sent to mobile device 2 using resources indicated to mobile device 2 at operation 316, the resources having been allocated to STA2 for NAV information/NAV updates by the BS. Although not shown, the BS may send signals to other mobile devices within the BS' cellular network letting such mobile devices know the NAV information that is based on the reserved Wi-Fi channel, each of the signals being sent using resources previously indicated to a corresponding one of the other mobile devices as having been allocated to a STA of the corresponding one of the other mobile devices for NAV information/NAV updates. At operation 334, STA2, having received the NAV information by way of operation 332, may then update its local NAV (and other STAs of the other mobile devices may do so in a similar way). This would allow AP1 to transmit the offloaded data to STA1 in the Wi-Fi network at operation 336 using the reserved Wi-Fi channel for cellular offload with a much lower chance of collision by virtue of the hidden node problem having been substantially reduced by way of BS signaling of NAV information.

Figure 4:
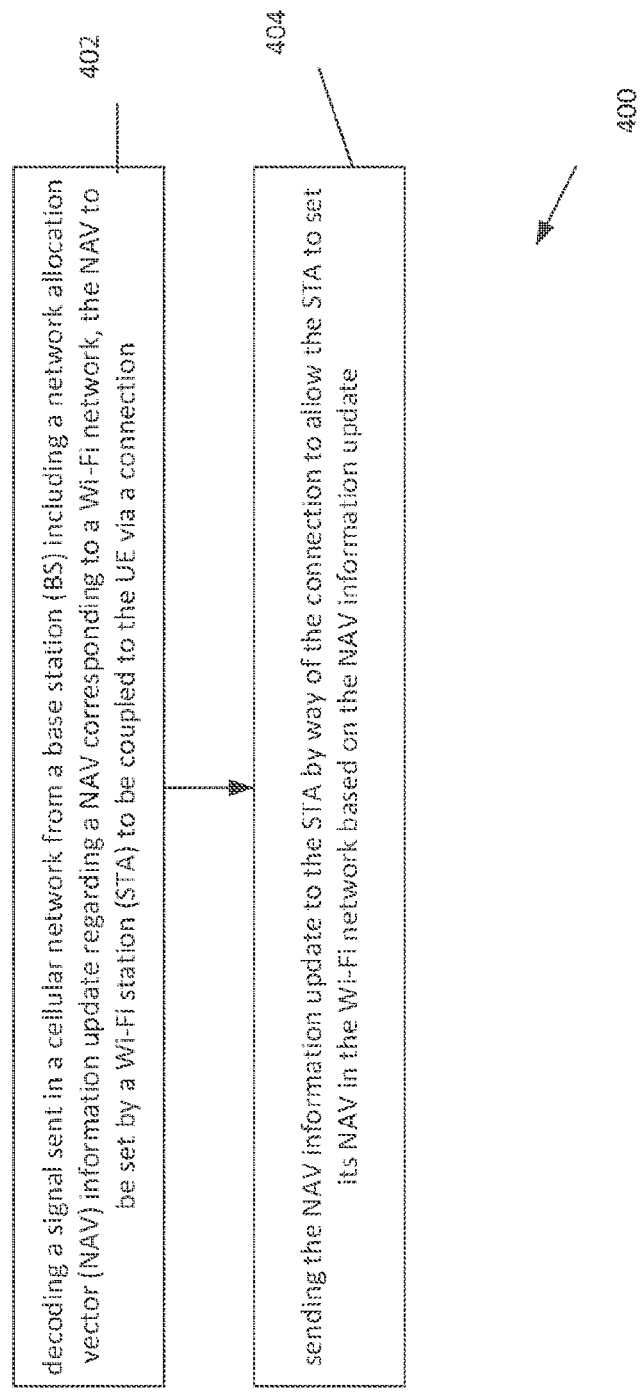
FIG. 4 illustrates a process according to an embodiment.

FIG. 4 illustrates a process 400 according to an embodiment. Process 400 includes, at operation 402, decoding a signal sent in a cellular network from a base station (BS), the signal including a network allocation vector (NAV) information update regarding a NAV corresponding to a Wi-Fi network, the NAV to be set by a Wi-Fi station (STA) that is in the Wi-Fi network, and that is to be coupled to the UE via a connection; and at operation 404, sending the NAV information update to the STA by way of the connection to allow the STA to set its NAV in the Wi-Fi network based on the NAV information update.

Figure 5:
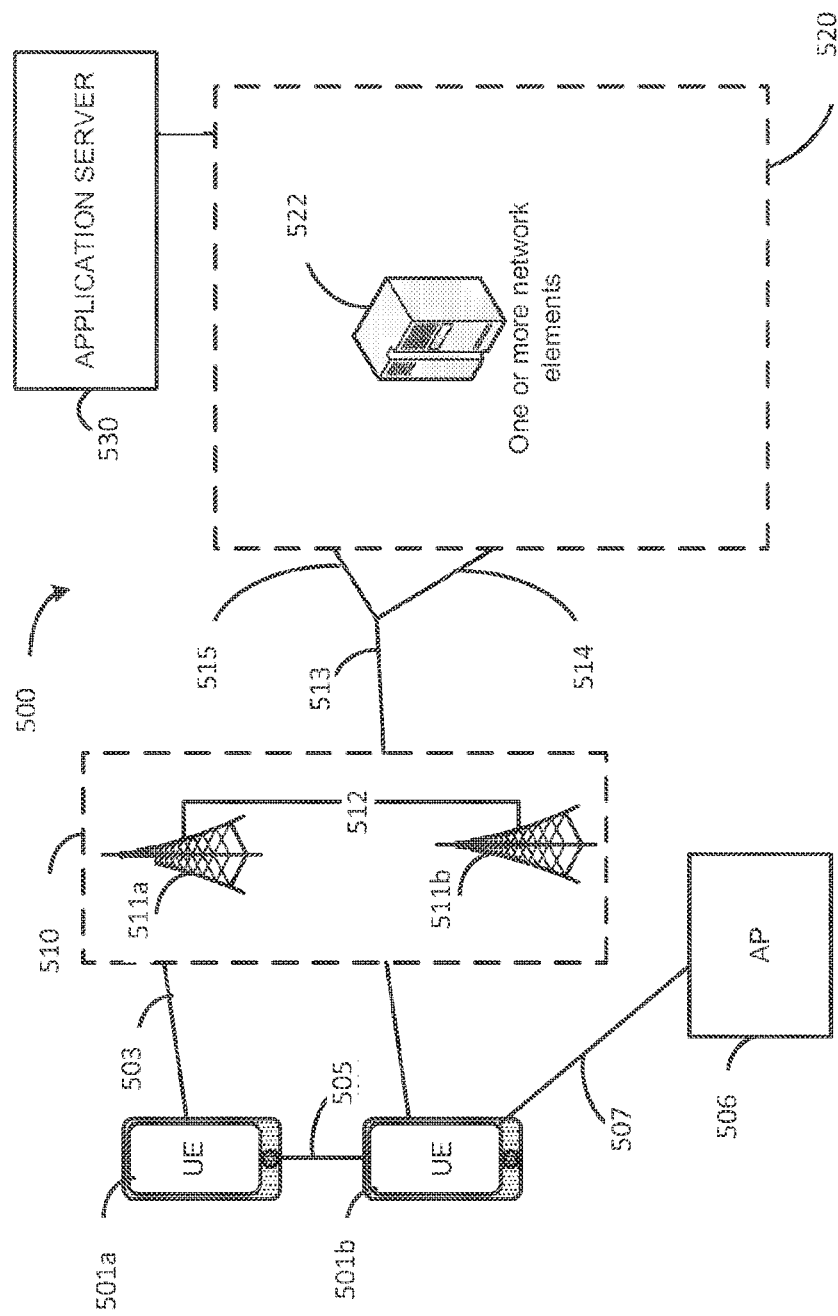
FIG. 5 illustrates an architecture of a system of wireless devices according to some embodiments.

FIG. 5 illustrates an example architecture of a system 500 of a network, in accordance with various embodiments. The following description is provided for an example system 500 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation {6G}) systems, IEEE 802.16 protocols (e.g., WMAN, WiMAX, etc.), or the like.

As shown by FIG. 5, the system 500 includes wireless device 501a and wireless device 501b (collectively referred to as "wireless devices 501" or "wireless device 501"). In this example, wireless devices 501 are illustrated as smartphones, but may also comprise any mobile or non-mobile computing device. Wireless devices 501 may include a UE for communication in a cellular network, such as with RAN 510, and a STA for communication in a Wi-Fi network, such as with AP 506. When a cellular functionality of wireless device 501 is being described, the instant description may refer to wireless device 501 as UE 501, and when a Wi-Fi functionality of wireless device 502 is being described, the instant description may refer to wireless device 502 as STA 501.

The UEs 501 may be configured to connect, for example, communicatively couple, with an or RAN 510. In embodiments, the RAN 510 may be an NG RAN or a 5G RAN, an E-UTRAN, or a legacy RAN, such as a UTRAN or GERAN. As used herein, the term "NG RAN" or the like may refer to a RAN 510 that operates in an NR or 5G system 500, and the term "E-UTRAN" or the like may refer to a RAN 510 that operates in an LTE or 4G system 500. The UEs 501 utilize connections (or channels) 503 and 504, respectively, each of which comprises a physical communications interface or layer (discussed in further detail below).

In this example, the connections 503 and 504 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 501 may directly exchange communication data via a Prose interface 505. The Prose interface 505 may alternatively be referred to as a SL interface 505 and may comprise one or more logical channels, including but not limited to a PSCCH, a PSSCH, a PSDCH, and a PSBCH.

The STA 501b is shown to be configured to access an AP 506 (also referred to as "WLAN node 506" "WLAN 506" "WLAN Termination 506" "WT 506" or the like) via a connection 507. The connection 507 can comprise a local wireless connection, such as a connection consistent with any IEEE 802.11 protocol, wherein the AP 506 would comprise a wireless fidelity (Wi-Fi®) router. In this example, the AP 506 is shown to be connected to the Internet without connecting to the core network of the wireless system (described in further detail below).

The RAN 510 can include one or more AN nodes or RAN nodes 511a and 511b (collectively referred to as "RAN nodes 511" or "RAN node 511") that enable the connections 503 and 504. As used herein, the terms "access node," "access point," or the like may describe equipment that provides the radio baseband functions for data and/or voice connectivity between a network and one or more users. These access nodes can be referred to as BS, NR evolved NodeBs (gNodeBs), RAN nodes, eNBs, NodeBs, RSUs, TRxPs or TRPs, and so forth. As used herein, the term "NG RAN node" or the like may refer to a RAN node 511 that operates in an NR or 5G system 500 (for example, a gNB), and the term "E-UTRAN node" or the like may refer to a RAN node 511 that operates in an LTE or 4G system 500 (e.g., an eNB). According to various embodiments, the RAN nodes 511 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In embodiments, the wireless devices 501 can be configured to communicate using OFDM communication signals with each other or with any of the RAN nodes 511 over a multicarrier communication channel in accordance with various communication techniques, such as, but not limited to, an OFDMA communication technique (e.g., for downlink communications) or a SC-FDMA communication technique (e.g., for uplink and Prose or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 511 to the UEs 501, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 501 and the RAN nodes 511, 512 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

The RAN nodes 511 may be configured to communicate with one another via interface 512. In embodiments where the system 500 is a 5G or NR system, the interface 512 may be an Xn interface 512. The Xn interface is defined between two or more RAN nodes 511 (e.g., two or more gNodeBs or gNBs and the like) that connect to 5GC 520, between a RAN node 511 (e.g., a gNB) connecting to 5GC 520 and an eNB, and/or between two eNBs connecting to 5GC 520.

The RAN 510 is shown to be communicatively coupled to a core network-in this embodiment, core network (CN) 520. The CN 520 may comprise a plurality of network elements 522, which are configured to offer various data and telecommunications services to customers/subscribers (e.g., users of UEs 501) who are connected to the CN 520 via the RAN 510. The components of the CN 520 may be implemented in one physical node or separate physical nodes including components to read and execute instructions from a machine-readable or computer-readable medium (e.g., a non-transitory machine-readable storage medium).

Generally, the application server 530 may be an element offering applications that use IP bearer resources with the core network (e.g., UMTS PS domain, LTE PS data services, etc.). The application server 530 can also be configured to support one or more communication services (e.g., VoIP sessions, PTT sessions, group communication sessions, social networking services, etc.) for the UEs 501 via the EPC 520.

In embodiments, the CN 520 may be a 5GC (referred to as "5GC 520" or the like), and the RAN 510 may be connected with the CN 520 via an NG interface 513. In embodiments, the NG interface 513 may be split into two parts, an NG user plane (NG-U) interface 514, which carries traffic data between the RAN nodes 511 and a UPF, and the S1 control plane (NG-C) interface 515, which is a signaling interface between the RAN nodes 511 and AMFs.

In embodiments, the CN 520 may be a 5G CN (referred to as "5GC 520" or the like), while in other embodiments, the CN 520 may be an EPC). Where CN 520 is an EPC (referred to as "EPC 520" or the like), the RAN 510 may be connected with the CN 520 via an SI interface 513. In embodiments, the SI interface 513 may be split into two parts, an SI user plane (SI-U) interface 514, which carries traffic data between the RAN nodes 511 and the S-GW, and the S1-MME interface 515, which is a signaling interface between the RAN nodes 511 and MMEs.

Figure 6:
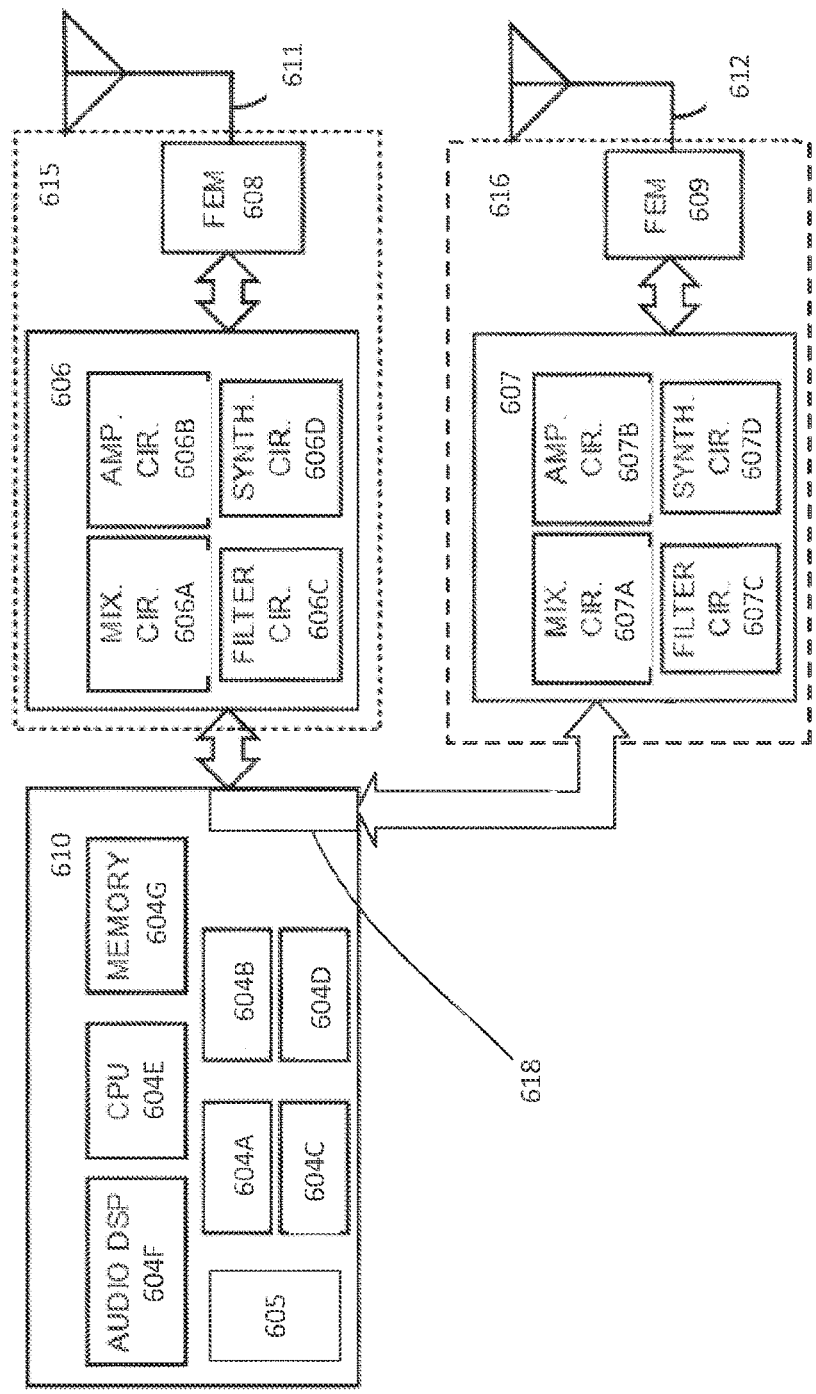
FIG. 6 illustrates example components of baseband circuitry and radio front end modules (RFEM) in accordance with various embodiments.

FIG. 6 illustrates example components of baseband circuitry 610 and radio front end modules (RFEM) with cellular RFEM 615 and Wi-Fi RFEM 616 in accordance with various embodiments. Baseband circuitry 610 includes a RF interface 618 connecting it to the RFEMs 615 and 616. Although the shown embodiments includes two separate RFEMs for the cellular and Wi-Fi signaling, respectively, embodiments are not so limited, and include within their scope the use of RFEMs where part of all of the RFEM circuitry is shared as between the cellular and Wi-Fi baseband processors. In the ensuing description, reference will be made to various baseband circuitry and RFEM components using reference numerals in the alternative, such as, for example, RFEMs 615/616. It will be apparent from the context herein that the first reference numeral, such as 615, is meant to refer to the RFEM with cellular functionality, and the second reference numeral, such as 616, is meant to refer to the RFEM with the Wi-Fi functionality.

As shown, the RFEMs 615/616 may include Radio Frequency (RF) circuitry 606/607, front-end module (FEM) circuitry 608/609, antenna array 611/612 coupled together at least as shown. Baseband circuitry 610 may be used as part of a UE and/or a STA, such as a UE/STA of a wireless device 501 of FIG. 5 described above.

The baseband circuitry 610 includes circuitry and/or control logic configured to carry out various radio/network protocol and radio control functions that enable communication with one or more radio networks via the RF circuitry 606/607. The radio control functions may include, but are not limited to, signal modulation/demodulation, encoding/decoding, radio frequency shifting, etc. In some embodiments, modulation/demodulation circuitry of the baseband circuitry 610 may include Fast-Fourier Transform (FFT), precoding, or constellation mapping/demapping functionality. In some embodiments, encoding/decoding circuitry of the baseband circuitry 610 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 610 is configured to process baseband signals received from a receive signal path of the RF circuitry 606/607 and to generate baseband signals for a transmit signal path of the RF circuitry 606/607. The baseband circuitry 610 is configured to interface with an application circuitry for generation and processing of the baseband signals and for controlling operations of the RF circuitry 606/607. The baseband circuitry 610 may handle various radio control functions.

The aforementioned circuitry and/or control logic of the baseband circuitry 610 may include one or more single or multi-core processors/processing circuitries. For example, the one or more processors may include a 3G baseband processor 604A, a 4G/LTE baseband processor 604B, a 5G/NR baseband processor 604C, Wi-Fi baseband processor 605, or some other baseband processor(s) 604D for other existing generations, generations in development or to be developed in the future (e.g., sixth generation {6G}, etc.). In other embodiments, some or all of the functionality of baseband processors 604A-D and 605 may be included in modules stored in the memory 604G and executed via a Central Processing Unit (CPU) 604E. In other embodiments, some or all of the functionality of baseband processors 604A-D and 605 may be provided as hardware accelerators (e.g., FPGAs, ASICs, etc.) loaded with the appropriate bit streams or logic blocks stored in respective memory cells. In various embodiments, the memory 604G may store program code of a real-time OS (RTOS), which when executed by the CPU 604E (or other baseband processor), is to cause the CPU 604E (or other baseband processor) to manage resources of the baseband circuitry 610, schedule tasks, etc. In addition, the baseband circuitry 610 includes one or more audio digital signal processor(s) (DSP) 604F. The audio DSP(s) 604F include elements for compression/decompression and echo cancellation and may include other suitable processing elements in other embodiments.

In some embodiments, each of the processors 604A-604E and 605 include respective memory interfaces to send/receive data to/from the memory 604G. The baseband circuitry 610 may further include one or more interfaces to communicatively couple to other circuitries/devices RF circuitry 606/607 may enable communication with wireless networks using modulated electromagnetic radiation through a non-solid medium.

In some embodiments, the receive signal path of the RF circuitry 606/607 may include mixer circuitry 606a/607a, amplifier circuitry 606b/607b and filter circuitry 606c/607c. In some embodiments, the transmit signal path of the RF circuitry 606/607 may include filter circuitry 606c/607c and mixer circuitry 606a/607a. RF circuitry 606/607 may also include synthesizer circuitry 606d/607d for synthesizing a frequency for use by the mixer circuitry 606a/607a of the receive signal path and the transmit signal path. In some embodiments, the mixer circuitry 606a/607a of the receive signal path may be configured to down-convert RF signals received from the FEM circuitry 608/609 based on the synthesized frequency provided by synthesizer circuitry 606d/607d. The amplifier circuitry 606b/607b may be configured to amplify the down-converted signals and the filter circuitry 606c/607c may be a low-pass filter (LPF) or band-pass filter (BPF) configured to remove unwanted signals from the down-converted signals to generate output baseband signals. Output baseband signals may be provided to the baseband circuitry 610 for further processing. In some embodiments, the output baseband signals may be zero-frequency baseband signals, although this is not a requirement. In some embodiments, mixer circuitry 606a of the receive signal path may comprise passive mixers, although the scope of the embodiments is not limited in this respect.

FEM circuitry 608/609 may include a receive signal path, which may include circuitry configured to operate on RF signals received from antenna array 611/612, amplify the received signals and provide the amplified versions of the received signals to the RF circuitry 606/607 for further processing. FEM circuitry 608/609 may also include a transmit signal path, which may include circuitry configured to amplify signals for transmission provided by the RF circuitry 606/607 for transmission by one or more of antenna elements of antenna array 611/612. In various embodiments, the amplification through the transmit or receive signal paths may be done solely in the RF circuitry 606/607, solely in the FEM circuitry 608/609, or in both the RF circuitry 606/609 and the FEM circuitry 608/609.

The antenna array 611/612 comprises one or more antenna elements, each of which is configured convert electrical signals into radio waves to travel through the air and to convert received radio waves into electrical signals. For example, digital baseband signals provided by the baseband circuitry 610 is converted into analog RF signals (e.g., modulated waveform) that will be amplified and transmitted via the antenna elements of the antenna array 611/612 including one or more antenna elements (not shown). The antenna elements may be omnidirectional, direction, or a combination thereof. The antenna elements may be formed in a multitude of arranges as are known and/or discussed herein. The antenna array 611/612 may comprise microstrip antennas or printed antennas that are fabricated on the surface of one or more printed circuit boards. The antenna array 611/612 may be formed in as a patch of metal foil (e.g., a patch antenna) in a variety of shapes, and may be coupled with the RF circuitry 606 and/or FEM circuitry 608/609 using metal transmission lines or the like.

One or more of the components of FIGS. 5 and/or 6, may be used in any of the embodiments described herein.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The components of FIGS. 5 and/or 6, such as the shown baseband processing circuitry including processing circuitry in each of the baseband processors shown, and a RF interface, may be used in any of the embodiments described herein, such as in a gNodeB or in a UE.

In some embodiments, the electronic device(s), network(s), system(s), chip(s) or component(s), or portions or implementations thereof, of FIGS. 5 and/or 6, or some other figure herein, may be configured to perform one or more processes, techniques, or methods as described herein, or portions thereof. One such process is depicted in FIG. 5.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

In some embodiments, the electronic device(s), network(s), system(s), chip(s) or component(s), or portions or implementations thereof, of FIGS. 5 and/or 6, or some other figure herein, may be configured to perform one or more processes, techniques, or methods as described herein, or portions thereof.

In some embodiments, the electronic device of FIGS. 5 and/or 6 may be configured to perform one or more processes, techniques, and/or methods as described herein, or portions thereof.

The components of FIGS. 5 and/or 6 may be used in any of the embodiments described herein.

In some embodiments, the electronic device(s), network(s), system(s), chip(s) or component(s), or portions or implementations thereof, of FIGS. 5 and/or 6, or some other figure herein, may be configured to perform one or more processes, techniques, or methods as described herein, or portions thereof.

For one or more embodiments, at least one of the components set forth in one or more of the preceding figures as appropriate may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 includes a device of a User Equipment (UE), the device including processing circuitry and a radio frequency (RF) interface coupled to the processing circuitry, the processing circuitry to: decode a signal sent in a cellular network from a base station (BS), the signal including a network allocation vector (NAV) information update regarding a NAV corresponding to a Wi-Fi network, the NAV to be set by a Wi-Fi station (STA) that is in the Wi-Fi network, and that is to be coupled to the UE via a connection; and send the NAV information update to the STA by way of the connection to allow the STA to set its NAV in the Wi-Fi network based on the NAV information update.

Example 2 includes the subject matter of Example 1, and optionally, wherein the processing circuitry is to cause communication with the BS via the cellular network simultaneously with the STA causing communication via the Wi-Fi network.

Example 3 includes the subject matter of any one of Examples-11, and optionally, wherein the signal is a second signal, the processing circuitry further to: decode a first signal sent via the cellular network from the BS, the first signal including information on a reserved resource allocation to carry NAV information updates for the STA, wherein the first signal further includes information on other reserved resource allocations to carry respective NAV information updates for respective other STAs within range of the cellular network; and determine the reserved resource allocation based on the first signal, wherein the NAV information update in the second signal is in a reserved resource of the second signal corresponding to the reserved resource allocation.

Example 4 includes the subject matter of Example 3, and optionally, wherein the information on the reserved resource allocation includes information on at least one of a resource block (RB), a subcarrier within the RB, an orthogonal frequency division multiplexing (OFDM) within the RB, or a resource element within the RB.

Example 5 includes the subject matter of any one of Examples 1-4, and optionally, wherein the processing circuitry is further to: decode a request signal sent via the cellular network from the BS including a request for a list of neighbor STAs relative to the STA; and encode for transmission to the BS via the cellular network a response signal including the list of neighbor STAs.

Example 6 includes the subject matter of any one of Examples 3-4, and optionally, wherein the information on the reserved resource allocation includes information on RB indexes corresponding to respective RBs in respective time slots of a radio frame, and on an orthogonal frequency division multiplexing (OFDM) symbol index corresponding to respective OFDM symbols in respective ones of the RBs, the processing circuitry to determine the reserved resource allocation based on the OFDM symbol index.

Example 7 includes the subject matter of Example 6, and optionally, wherein the reserved resource is modulated using quadrature phase shift keying (QPSK), and wherein each of the respective OFDM symbols contains a pair of bits having a value of one of 00, 01, 10 or 11, the NAV information update being based on the value.

Example 8 includes the subject matter of Example 7, and optionally, wherein at least one of: the value of 00 is to indicate a NAV information update value of one fourth of an OFDM symbol duration; the value of 01 is to indicate a NAV information update value of two fourths of an OFDM symbol duration; the value of 10 is to indicate a NAV information update value of three fourths of an OFDM symbol duration; the value of 11 is to indicate a NAV information update value of an OFDM symbol duration; or a lack of energy in each of the respective OFDM symbols is to indicate a NAV information update value of zero.

Example 9 includes the subject matter of any one of Examples 1-8, and optionally, wherein the cellular network includes one of a Long Term Evolution (LTE) or a LTE-Advanced (LTE-A) network with a normal cyclic prefix (CP), a LTE or a LTE-A network with an extended CP, a New Radio (NR) network with subcarrier space index of 0, a NR network with a subcarrier space index of 1, a NR network with a subcarrier space index of 2 with normal CP, a NR network with a subcarrier space index of 2 with extended CP, a NR network with a subcarrier space index of 3, a NR network with a subcarrier space index of 4, or a NR network with a subcarrier space index of 5.

Example 10 includes the subject matter of any one of Examples 1-9, and optionally, wherein further including a front-end module coupled to the RF interface.

Example 11 includes the subject matter of Example 10, and optionally, further including one or more antennas coupled to the front-end module to transmit or receive signals via the cellular network.

Example 12 includes a method to be used at a device of a User Equipment (UE), the method including: decoding a signal sent in a cellular network from a base station (BS), the signal including a network allocation vector (NAV) information update regarding a NAV corresponding to a Wi-Fi network, the NAV to be set by a Wi-Fi station (STA) that is in the Wi-Fi network, and that is to be coupled to the UE via a connection; and sending the NAV information update to the STA by way of the connection to allow the STA to set its NAV in the Wi-Fi network based on the NAV information update.

Example 13 includes the subject matter of Example 12, and optionally, including causing communication with the BS via the cellular network simultaneously with the STA causing communication via the Wi-Fi network.

Example 14 includes the method of any one of Examples 12-13, and optionally, wherein the signal is a second signal, the method further including: decoding a first signal sent via the cellular network from the BS, the first signal including information on a reserved resource allocation to carry NAV information updates for the STA, wherein the first signal further includes information on other reserved resource allocations to carry respective NAV information updates for respective other STAs within range of the cellular network; and determining the reserved resource allocation based on the first signal, wherein the NAV information update in the second signal is in a reserved resource of the second signal corresponding to the reserved resource allocation.

Example 15 includes the subject matter of Example 14, and optionally, wherein the information on the reserved resource allocation includes information on at least one of a resource block (RB), a subcarrier within the RB, an orthogonal frequency division multiplexing (OFDM) within the RB, or a resource element within the RB.

Example 16 includes the method of any one of Examples 12-15, and optionally, further including: decoding a request signal sent via the cellular network from the BS including a request for a list of neighbor STAs relative to the STA; and encoding for transmission to the BS via the cellular network a response signal including the list of neighbor STAs.

Example 17 includes the method of any one of Examples 14-15, and optionally, wherein the information on the reserved resource allocation includes information on RB indexes corresponding to respective RBs in respective time slots of a radio frame, and on an orthogonal frequency division multiplexing (OFDM) symbol index corresponding to respective OFDM symbols in respective ones of the RBs, the method further including determining the reserved resource allocation based on the OFDM symbol index.

Example 18 includes the subject matter of Example 17, and optionally, wherein the reserved resource is modulated using quadrature phase shift keying (QPSK), and wherein each of the respective OFDM symbols contains a pair of bits having a value of one of 00, 01, 10 or 11, the NAV information update being based on the value.

Example 19 includes the subject matter of Example 18, and optionally, wherein at least one of: the value of 00 is to indicate a NAV information update value of one fourth of an OFDM symbol duration; the value of 01 is to indicate a NAV information update value of two fourths of an OFDM symbol duration; the value of 10 is to indicate a NAV information update value of three fourths of an OFDM symbol duration; the value of 11 is to indicate a NAV information update value of an OFDM symbol duration; or a lack of energy in each of the respective OFDM symbols is to indicate a NAV information update value of zero.

Example 20 includes the method of any one of Examples 12-19, and optionally, wherein the cellular network includes one of a Long Term Evolution (LTE) or a LTE-Advanced (LTE-A) network with a normal cyclic prefix (CP), a LTE or a LTE-A network with an extended CP, a New Radio (NR) network with subcarrier space index of 0, a NR network with a subcarrier space index of 1, a NR network with a subcarrier space index of 2 with normal CP, a NR network with a subcarrier space index of 2 with extended CP, a NR network with a subcarrier space index of 3, a NR network with a subcarrier space index of 4, or a NR network with a subcarrier space index of 5.

Example 21 includes a device of a User Equipment (UE), the device including: means for decoding a signal sent in a cellular network from a base station (BS), the signal including a network allocation vector (NAV) information update regarding a NAV corresponding to a Wi-Fi network, the NAV to be set by a Wi-Fi station (STA) that is in the Wi-Fi network, and that is to be coupled to the UE via a connection; and means for sending the NAV information update to the STA by way of the connection to allow the STA to set its NAV in the Wi-Fi network based on the NAV information update.

Example 22 includes the subject matter of Example 21, and optionally, wherein the connection is a wired connection.

Example 23 includes the device of any one of Examples 21-22, and optionally, wherein the signal is a second signal, the device further including: means for decoding a first signal sent via the cellular network from the BS, the first signal including information on a reserved resource allocation to carry NAV information updates for the STA, wherein the first signal further includes information on other reserved resource allocations to carry respective NAV information updates for respective other STAs within range of the cellular network; and means for determining the reserved resource allocation based on the first signal, wherein the NAV information update in the second signal is in a reserved resource of the second signal corresponding to the reserved resource allocation.

Example 24 includes the subject matter of Example 23, and optionally, wherein the information on the reserved resource allocation includes information on at least one of a resource block (RB), a subcarrier within the RB, an orthogonal frequency division multiplexing (OFDM) within the RB, or a resource element within the RB.

Example 25 includes a machine readable medium including code which, when executed, is to cause a machine to perform the method of any one of Examples 12-20.

Example 26 includes a device of a cellular Base Station (BS), the device including processing circuitry and a radio frequency (RF) interface coupled to the processing circuitry, the processing circuitry to: encode a signal for transmission to a User Equipment (UE) in a cellular network, the signal including a network allocation vector (NAV) information update regarding a NAV corresponding to a Wi-Fi network, the NAV to be set by a Wi-Fi station (STA) that is in the Wi-Fi network, and that is to be coupled to the UE via a connection, the NAV further based on the NAV information update; and cause transmission of the signal to the UE.

Example 27 includes the subject matter of Example 26, and optionally, wherein: the signal is a second signal, the processing circuitry further to encode a first signal for transmission to the UE via the cellular network, the first signal including information on a reserved resource allocation to carry NAV information updates for the STA; and the first signal further includes information on other reserved resource allocations to carry respective NAV information updates for respective other STAs within range of the cellular network, and wherein the NAV information update in the second signal is in a reserved resource of the second signal corresponding to the reserved resource allocation.

Example 28 includes the subject matter of Example 27, and optionally, wherein the information on the reserved resource allocation includes information on at least one of a resource block (RB), a subcarrier within the RB, an orthogonal frequency division multiplexing (OFDM) within the RB, or a resource element within the RB.

Example 29 includes the subject matter of Example 27, and optionally, wherein the processing circuitry is further to: encode a request signal for transmission to the UE via the cellular network, the request signal including a request for a list of neighbor STAs relative to the STA; decode a response signal sent via the cellular network by the UE, the response signal including the list of neighbor STAs; and determine the reserved resource allocation for the STA and the other reserved resource allocations for the respective other STAs based on the response signal.

Example 30 includes the device of any one of Examples 27-29, and optionally, wherein the information on the reserved resource allocation includes information on RB indexes corresponding to respective RBs in respective time slots of a radio frame, and on an orthogonal frequency division multiplexing (OFDM) symbol index corresponding to respective OFDM symbols in respective ones of the RBs, the reserved resource allocation being based on the OFDM symbol index.

Example 31 includes the subject matter of Example 30, and optionally, wherein the reserved resource is modulated using quadrature phase shift keying (QPSK), and wherein each of the respective OFDM symbols contains a pair of bits having a value of one of 00, 01, 10 or 11, the NAV information update being based on the value.

Example 32 includes the subject matter of Example 31, and optionally, wherein at least one of: the value of 00 is to indicate a NAV information update value of one fourth of an OFDM symbol duration; the value of 01 is to indicate a NAV information update value of two fourths of an OFDM symbol duration; the value of 10 is to indicate a NAV information update value of three fourths of an OFDM symbol duration; the value of 11 is to indicate a NAV information update value of an OFDM symbol duration; or a lack of energy in each of the respective OFDM symbols is to indicate a NAV information update value of zero.

Example 33 includes the device of any one of Examples 26-32, and optionally, wherein the cellular network includes one of a Long Term Evolution (LTE) or a LTE-Advanced (LTE-A) network with a normal cyclic prefix (CP), a LTE or a LTE-A network with an extended CP, a New Radio (NR) network with subcarrier space index of 0, a NR network with a subcarrier space index of 1, a NR network with a subcarrier space index of 2 with normal CP, a NR network with a subcarrier space index of 2 with extended CP, a NR network with a subcarrier space index of 3, a NR network with a subcarrier space index of 4, or a NR network with a subcarrier space index of 5.

Example 34 includes the subject matter of Example 27, and optionally, wherein the processing circuitry is to: decode an indication from a Wi-Fi access point (AP) that is within the Wi-Fi network and to which the STA is associated; and determine, from the indication, STAs associated with the AP, the STAs associated with the AP including the STA and at least some of the respective other STAs.

Example 35 includes the subject matter of Example 34, and optionally, the processing circuitry further to: encode for transmission to the AP a request to offload, to the AP, data intended for the STA; decode a signal from the AP including an indication of a reserved Wi-Fi channel to be used by the AP to transmit the data to the STA; encode the first signal such that the NAV information update therein is based on the indication of the reserved Wi-Fi channel, the first signal being encoded for transmission to said respective other STAs to cause said respective other STAs to set NAVs based on the NAV information update; and encode the data for transmission to the STA via the reserved Wi-Fi channel.

Example 36 includes the device of any one of Examples 26-35, and optionally, further including a front-end module coupled to the RF interface.

Example 37 includes the subject matter of Example 36, and optionally, further including one or more antennas coupled to the front-end module to transmit or receive signals via the cellular network.

Example 38 includes a method to be performed at a device of a cellular Base Station (BS), the method including: encoding a signal for transmission to a User Equipment (UE) in a cellular network, the signal including a network allocation vector (NAV) information update regarding a NAV corresponding to a Wi-Fi network, the NAV to be set by a Wi-Fi station (STA) that is in the Wi-Fi network, and that is to be coupled to the UE via a connection, the NAV further based on the NAV information update; and causing transmission of the signal to the UE.

Example 39 includes the subject matter of Example 38, and optionally, wherein: the signal is a second signal, the method further including encoding a first signal for transmission to the UE via the cellular network, the first signal including information on a reserved resource allocation to carry NAV information updates for the STA; and the first signal further includes information on other reserved resource allocations to carry respective NAV information updates for respective other STAs within range of the cellular network, and wherein the NAV information update in the second signal is in a reserved resource of the second signal corresponding to the reserved resource allocation.

Example 40 includes the subject matter of Example 39, and optionally, wherein the information on the reserved resource allocation includes information on at least one of a resource block (RB), a subcarrier within the RB, an orthogonal frequency division multiplexing (OFDM) within the RB, or a resource element within the RB.

Example 41 includes the subject matter of Example 39, and optionally, further including: encoding a request signal for transmission to the UE via the cellular network, the request signal including a request for a list of neighbor STAs relative to the STA; decoding a response signal sent via the cellular network by the UE, the response signal including the list of neighbor STAs; and determining the reserved resource allocation for the STA and the other reserved resource allocations for the respective other STAs based on the response signal.

Example 42 includes the method of any one of Examples 39-41, and optionally, wherein the information on the reserved resource allocation includes information on RB indexes corresponding to respective RBs in respective time slots of a radio frame, and on an orthogonal frequency division multiplexing (OFDM) symbol index corresponding to respective OFDM symbols in respective ones of the RBs, the reserved resource allocation being based on the OFDM symbol index.

Example 43 includes the subject matter of Example 42, and optionally, wherein the reserved resource is modulated using quadrature phase shift keying (QPSK), and wherein each of the respective OFDM symbols contains a pair of bits having a value of one of 00, 01, 10 or 11, the NAV information update being based on the value.

Example 44 includes the subject matter of Example 43, and optionally, wherein at least one of: the value of 00 is to indicate a NAV information update value of one fourth of an OFDM symbol duration; the value of 01 is to indicate a NAV information update value of two fourths of an OFDM symbol duration; the value of 10 is to indicate a NAV information update value of three fourths of an OFDM symbol duration; the value of 11 is to indicate a NAV information update value of an OFDM symbol duration; or a lack of energy in each of the respective OFDM symbols is to indicate a NAV information update value of zero.

Example 45 includes the method of any one of Examples 38-44, and optionally, wherein the cellular network includes one of a Long Term Evolution (LTE) or a LTE-Advanced (LTE-A) network with a normal cyclic prefix (CP), a LTE or a LTE-A network with an extended CP, a New Radio (NR) network with subcarrier space index of 0, a NR network with a subcarrier space index of 1, a NR network with a subcarrier space index of 2 with normal CP, a NR network with a subcarrier space index of 2 with extended CP, a NR network with a subcarrier space index of 3, a NR network with a subcarrier space index of 4, or a NR network with a subcarrier space index of 5.

Example 46 includes the subject matter of Example 39, and optionally, further including: decoding an indication from a Wi-Fi access point (AP) that is within the Wi-Fi network and to which the STA is associated; and determining, from the indication, STAs associated with the AP, the STAs associated with the AP including the STA and at least some of the respective other STAs.

Example 47 includes the subject matter of Example 46, and optionally, further including: encoding for transmission to the AP a request to offload, to the AP, data intended for the STA; decoding a signal from the AP including an indication of a reserved Wi-Fi channel to be used by the AP to transmit the data to the STA; encoding the first signal such that the NAV information update therein is based on the indication of the reserved Wi-Fi channel, the first signal being encoded for transmission to said respective other STAs to cause said respective other STAs to set NAVs based on the NAV information update; and encoding the data for transmission to the STA via the reserved Wi-Fi channel.

Example 48 includes a device of a cellular Base Station (BS), the device including: means for encoding a signal for transmission to a User Equipment (UE) in a cellular network, the signal including a network allocation vector (NAV) information update regarding a NAV corresponding to a Wi-Fi network, the NAV to be set by a Wi-Fi station (STA) that is in the Wi-Fi network, and that is to be coupled to the UE via a connection, the NAV further based on the NAV information update; and means for causing transmission of the signal to the UE.

Example 49 includes the subject matter of Example 48, and optionally, wherein: the signal is a second signal, the device further including means for encoding a first signal for transmission to the UE via the cellular network, the first signal including information on a reserved resource allocation to carry NAV information updates for the STA; and the first signal further includes information on other reserved resource allocations to carry respective NAV information updates for respective other STAs within range of the cellular network, and wherein the NAV information update in the second signal is in a reserved resource of the second signal corresponding to the reserved resource allocation.

Example 50 includes the subject matter of Example 49, and optionally, wherein the information on the reserved resource allocation includes information on at least one of a resource block (RB), a subcarrier within the RB, an orthogonal frequency division multiplexing (OFDM) within the RB, or a resource element within the RB.

Example 51 includes a machine-readable medium including code which, when executed, is to cause a machine to perform the method of any one of the method Examples above.

Example 52 includes a product comprising one or more tangible computer-readable non-transitory storage media comprising computer-executable instructions operable to, when executed by at least one computer processor, enable the at least one computer processor to perform the method of any one of the method Examples above.

Example 53 includes an apparatus comprising means for causing a wireless communication device to perform the method of any one of the method Examples above.

Example 54 includes a signal as described in or related to any of the examples above, or portions or parts thereof.

Example 55 includes a signal in a wireless network as shown and described herein.

Example 56 includes a method of communicating in a wireless network as shown and described herein.

Example 57 includes a system for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed.

What is claimed is:

1. An device of a User Equipment (UE), the device including processing circuitry and a radio frequency (RF) interface coupled to the processing circuitry, the processing circuitry to:
   decode a signal sent in a cellular network from a base station (BS), the signal including a network allocation vector (NAV) information update regarding a NAV corresponding to a Wi-Fi network, the NAV to be set by a Wi-Fi station (STA) that is in the Wi-Fi network, and wherein the STA is to be coupled to the UE via a connection; and
   send the NAV information update to the STA by way of the connection to allow the STA to set the NAV in the Wi-Fi network based on the NAV information update.

2. The device of claim 1, wherein the processing circuitry is to cause communication with the BS via the cellular network simultaneously with the STA causing communication via the Wi-Fi network.

3. The device of claim 1, wherein the signal is a second signal, the processing circuitry further to:
   decode a first signal sent via the cellular network from the BS, the first signal including information on a reserved resource allocation to carry NAV information updates for the STA, wherein the first signal further includes information on other reserved resource allocations to carry respective NAV information updates for respective other STAs within range of the cellular network; and
   determine the reserved resource allocation based on the first signal, wherein the NAV information update in the second signal is in a reserved resource of the second signal corresponding to the reserved resource allocation.

4. The device of claim 3, wherein the information on the reserved resource allocation includes information on at least one of a resource block (RB), a subcarrier within the RB, an orthogonal frequency division multiplexing (OFDM) symbol within the RB, or a resource element within the RB.

5. The device of claim 1, wherein the processing circuitry is further to:
   decode a request signal sent via the cellular network from the BS including a request for a list of neighbor STAs relative to the STA; and
   encode for transmission to the BS via the cellular network a response signal including the list of neighbor STAs.

6. The device of claim 3, wherein the information on the reserved resource allocation includes information on resource block (RB) indexes corresponding to respective RBs in respective time slots of a radio frame, and on an orthogonal frequency division multiplexing (OFDM) symbol index corresponding to respective OFDM symbols in respective ones of the RBs.

7. The device of claim 6, wherein the reserved resource is modulated using quadrature phase shift keying (QPSK), and wherein each of the respective OFDM symbols contains a pair of bits having a value of one of 00, 01, 10 or 11, the NAV information update being based on the value.

8. The device of claim 7, wherein at least one of:
   the value of 00 is to indicate a NAV information update value of one fourth of an OFDM symbol duration;
   the value of 01 is to indicate a NAV information update value of two fourths of an OFDM symbol duration;
   the value of 10 is to indicate a NAV information update value of three fourths of an OFDM symbol duration;
   the value of 11 is to indicate a NAV information update value of an OFDM symbol duration; or
   a lack of energy in each of the respective OFDM symbols is to indicate a NAV information update value of zero.

9. The device of claim 8, wherein the cellular network includes one of a Long Term Evolution (LTE) or a LTE-Advanced (LTE-A) network with a normal cyclic prefix (CP), a LTE or a LTE-A network with an extended CP, a New Radio (NR) network with subcarrier space index of 0, a NR network with a subcarrier space index of 1, a NR network with a subcarrier space index of 2 with normal CP, a NR network with a subcarrier space index of 2 with extended CP, a NR network with a subcarrier space index of 3, a NR network with a subcarrier space index of 4, or a NR network with a subcarrier space index of 5.

10. The device of claim 8, further including a front-end module coupled to the RF interface.

11. The device of claim 10, further including one or more antennas coupled to the front-end module to transmit or receive signals via the cellular network.

12. A method to be used at a device of a User Equipment (UE), the method including:
    decoding a signal sent in a cellular network from a base station (BS), the signal including a network allocation vector (NAV) information update regarding a NAV corresponding to a Wi-Fi network, the NAV to be set by a Wi-Fi station (STA) that is in the Wi-Fi network, and that is to be coupled to the UE via a connection; and
    sending the NAV information update to the STA by way of the connection to allow the STA to set its NAV in the Wi-Fi network based on the NAV information update.

13. The method of claim 12, including causing communication with the BS via the cellular network simultaneously with the STA causing communication via the Wi-Fi network.

14. The method of claim 12, wherein the signal is a second signal, the method further including:
    decoding a first signal sent via the cellular network from the BS, the first signal including information on a reserved resource allocation to carry NAV information updates for the STA, wherein the first signal further includes information on other reserved resource allocations to carry respective NAV information updates for respective other STAs within range of the cellular network; and
    determining the reserved resource allocation based on the first signal, wherein the NAV information update in the second signal is in a reserved resource of the second signal corresponding to the reserved resource allocation.

15. The method of claim 14, wherein the information on the reserved resource allocation includes information on at least one of a resource block (RB), a subcarrier within the RB, an orthogonal frequency division multiplexing (OFDM) symbol within the RB, or a resource element within the RB.

16. The method of claim 12, further including:
    decoding a request signal sent via the cellular network from the BS including a request for a list of neighbor STAs relative to the STA; and
    encoding for transmission to the BS via the cellular network a response signal including the list of neighbor STAs.

17. The method of claim 14, wherein the information on the reserved resource allocation includes information on RB indexes corresponding to respective RBs in respective time slots of a radio frame, and on an orthogonal frequency division multiplexing (OFDM) symbol index corresponding to respective OFDM symbols in respective ones of the RBs, the method further including determining the reserved resource allocation based on the OFDM symbol index.

18. A device of a User Equipment (UE), the device including:
    means for decoding a signal sent in a cellular network from a base station (BS), the signal including a network allocation vector (NAV) information update regarding a NAV corresponding to a Wi-Fi network, the NAV to be set by a Wi-Fi station (STA) that is in the Wi-Fi network, and that is to be coupled to the UE via a connection; and
    means for sending the NAV information update to the STA by way of the connection to allow the STA to set its NAV in the Wi-Fi network based on the NAV information update.

19. The device of claim 18, wherein the connection is a wired connection.

20. The device of claim 18, wherein the signal is a second signal, the device further including:
    means for decoding a first signal sent via the cellular network from the BS, the first signal including information on a reserved resource allocation to carry NAV information updates for the STA, wherein the first signal further includes information on other reserved resource allocations to carry respective NAV information updates for respective other STAs within range of the cellular network; and
    means for determining the reserved resource allocation based on the first signal, wherein the NAV information update in the second signal is in a reserved resource of the second signal corresponding to the reserved resource allocation.

* * * * *